United States Patent [19]

Messner et al.

[11] 4,359,121

[45] Nov. 16, 1982

[54] LIFT TRUCK HOOD MECHANISM AND METHOD FOR OPERATION THEREOF

[75] Inventors: John S. Messner; Louis A. Haddock, both of Battle Creek, Mich.

[73] Assignee: Clark Equipment Company, Buchanan, Mich.

[21] Appl. No.: 209,748

[22] Filed: Nov. 24, 1980

[51] Int. Cl.³ ............................................. B62D 25/12
[52] U.S. Cl. ..................................... 180/69 R; 108/4; 280/756
[58] Field of Search ................. 180/68.5, 89.17, 69 R; 280/756; 49/241, 246, 260, 339; 108/1, 4, 10; 296/76, 100

[56] References Cited

U.S. PATENT DOCUMENTS

| | | | |
|---|---|---|---|
| 1,654,878 | 1/1928 | Holler et al. | 296/76 |
| 2,820,239 | 1/1958 | Johannsen | 16/1 C |
| 2,931,452 | 4/1960 | Mackie | 180/69 C |
| 3,487,887 | 1/1970 | Pensa | 180/69 C |

FOREIGN PATENT DOCUMENTS

| | | | |
|---|---|---|---|
| 591683 | 2/1960 | Canada | 180/69 R |
| 2152294 | 5/1973 | Fed. Rep. of Germany | 180/69 R |
| 2456067 | 12/1980 | France | 180/68.5 |
| 717876 | 11/1954 | United Kingdom | 180/68.5 |

Primary Examiner—Robert J. Spar
Assistant Examiner—Donald W. Underwood
Attorney, Agent, or Firm—Marmaduke A. Hobbs

[57] ABSTRACT

A lift truck hood mechanism and method for operation thereof in which a cover is provided for the truck power source compartment and is movable from a substantially horizontal closed position to a substantially vertical opened position at the rear of the compartment. The rearward end of the cover is raised and guided in a linear path by hand or by rollers operating in tracks in the rear support members of the overhead guard assembly. The cover is pivoted about a transverse axis midway between the forward and rearward ends of the cover, and is moved toward the support members as the one end is raised. Torsion bars may be used to assist in moving the cover and to secure the cover in the open position. The operator's seat has a hinged mounting bracket and is movable between positions over the top of the front of the cover to hold the cover closed and against the steering wheel permitting the cover to be opened. A locking device prevents accidental movement of the rear of the hood.

23 Claims, 12 Drawing Figures

LIFT TRUCK HOOD MECHANISM AND METHOD FOR OPERATION THEREOF

In industrial vehicles such as fork lift trucks and the like, to promote maneuverability of the vehicle within crowded working environments commonly found in warehouses or the like, a compact vehicle structure is highly desirable. Thus, in the typical fork lift truck, the vehicle operator's seat and controls are located near the forward end of the vehicle, with the seat normally being positioned above at least a portion of the vehicle's power source, usually either an internal combustion engine or an electric power source in the form of a bank of storage batteries. It is necessary in such a vehicle to provide a cover over the battery or engine compartment for the protection of the driver. The cover, or covers, must be removable, to permit access to the engine or batteries for normal maintenance and for major repairs or replacement. The removal of the covers is often made more difficult on industrial vehicles by the existence of an overhead guard structure or cage, which is provided to protect the vehicle operator from falling articles that may be dislodged from stacks or piles, and which serves as a roll cage to protect the operator in the event the vehicle is tipped over during operation. The guard structure is directly above the operator's area, hence directly above the covers, and has rear support members only a short distance behind the operator's seat which also may interfere with removal of the covers.

The conventional covers previously used over the battery compartments were heavy, and because of the guard structure and the rear supports therefor, the covers were difficult and awkward to remove from the vehicle. Often two men were required to remove the cover and maneuver it around the supporting structure. The covers had to be completely removed to provide access for even regular minor maintenance which otherwise could be performed relatively quickly, such as checking and refilling the storage batteries or periodic maintenance on the engine. Since the covers were difficult to remove even for normal maintenance, the periodic maintenance of the engine or batteries became tedious and time consuming. If the covers could not be removed conveniently, maintenance schedules were often ignored, and vehicle servicing was extended long past the scheduled term. Emergency repairs by the operator were difficult, and downtime during which the vehicle was unavailable for service was increased.

One alternative to a one piece hood which provides for removal by one person is a multipiece hood which is disassembled and removed as required. Removal of a multipiece hood is, of course, time consuming, since normally bolts, clamps or other locking devices are provided to hold the pieces of the hood together, and the locking devices must be undone before the cover, or any portion thereof, can be removed. When the repairs or servicing is completed, the hood must be repositioned, and the locking devices refastened, again requiring substantial amounts of time. With a multipiece hood the likelihood is increased that parts such as bolts, nuts or the like will be damaged during removal to the extent that replacement will be required, or that parts will be misplaced temporarily, or lost completely during servicing of the vehicle, hence causing further inconvenience and expenditure of time to locate or replace missing or damaged parts.

Another alternative hood design includes a swing out or pivoted cover plate. The seat may be rigidly mounted to the cover plate and thus require complete removal to open the hood, or the seat may be movable to a noninterfering position away from the cover plate. The cover plate may be hinged to the compartment and pivoted about the hinge to a position against the steering wheel, or may be attached near one corner by a vertical axis and pivoted about the axis to a relatively noninterfering position. Any of the above variations also present some interference by the cover to convenient access to the compartment, especially if the work area around the vehicle is limited.

It is therefore one of the principal objects of the present invention to provide a battery compartment hood mechanism which can be opened and closed easily and quickly by only one person with a minimal effort, and which opens to a fully noninterfering position, permitting full access to the battery or engine compartment even when the work area around the vehicle is limited.

Another object of the present invention is to provide a battery compartment hood mechanism which has a one piece cover to minimize the time and effort required to open the cover and which has no loose parts or parts to be removed when the cover is opened, hence eliminating the possibility of losing or misplacing parts.

A further object of the present invention is to provide a battery compartment hood mechanism which has locking features to hold the hood in both the opened and closed positions, thereby eliminating the possibility of the hood opening or closing accidentally, and which includes an operator's seat located above the hood during operation of the vehicle which may be moved quickly to an out of the way position permitting opening of the hood and access to the power source compartment.

A still further object of the present invention is to provide a method for opening a fork lift truck battery compartment hood which enables one person to quickly and easily open the hood to an out of the way position without removing the hood from the vehicle, and which is adaptable for use on hoods constructed of various materials, including metal hoods and plastic or fiberglass hoods.

Additional objects and advantages of the present invention will become apparent from the following detailed description and the accompanying drawings, wherein.

Figure 1:
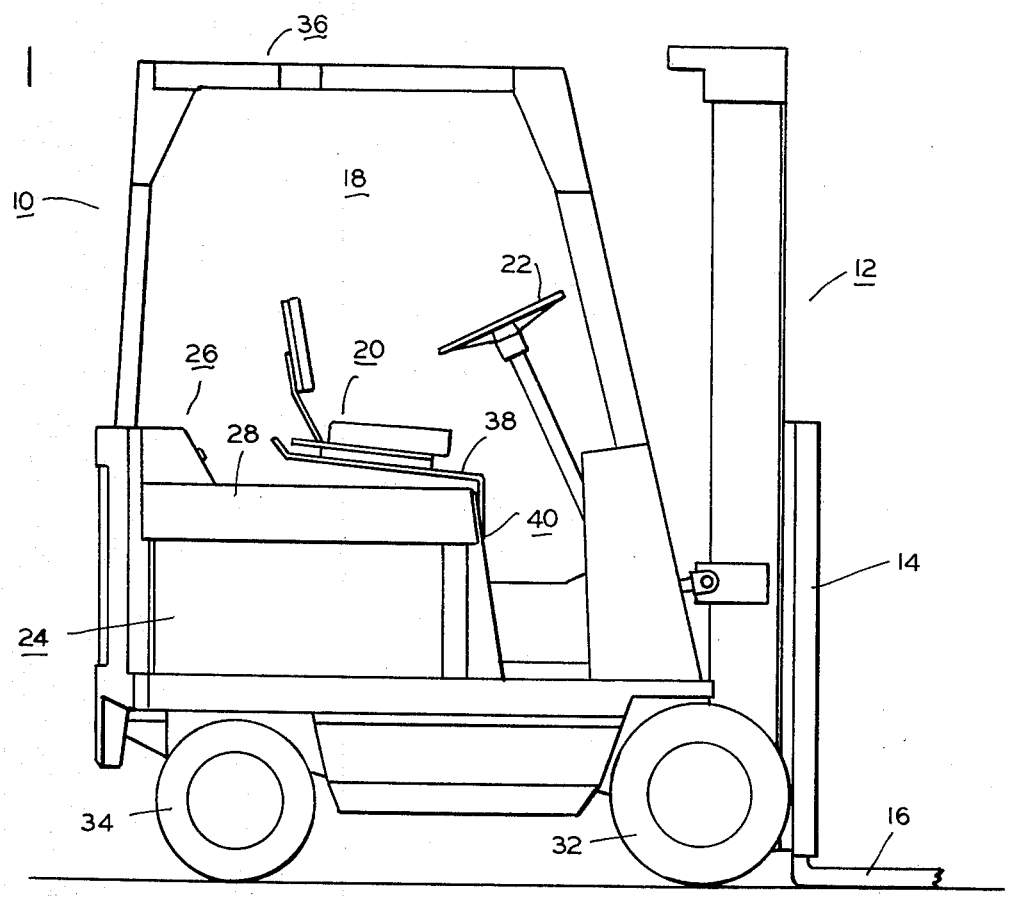
FIG. 1 is a side elevational view of a fork lift truck having a battery compartment hood mechanism embodying the present invention, the cover thereof being in the closed position.

Referring more specifically to the drawings, and to FIG. 1 in particular, numeral 10 designates an electric fork lift truck having a lifting mast assembly 12 mounted on the front thereof, including a lifting carriage 14 with forks 16 vertically movable thereon. An operator's control station 18, having a seat 20 and a steering wheel 22, is located behind the lifting mast assembly, with the seat being positioned generally above the forward end of a battery compartment 24. A hood mechanism 26 embodying the present invention is provided for battery compartment 24, with the hood or cover 28 thereof being movable between the closed position shown in FIG. 1 and the fully opened position shown in FIG. 2. The present hood mechanism may be used advantageously on lift trucks and other vehicles having internal combustion engines as well as on the electrically powered fork lift truck shown in the drawings, and it should be understood that reference to the batteries or battery compartment, or to the lift truck, used hereinafter, is for simplicity and not by way of limitation.

Figure 2:
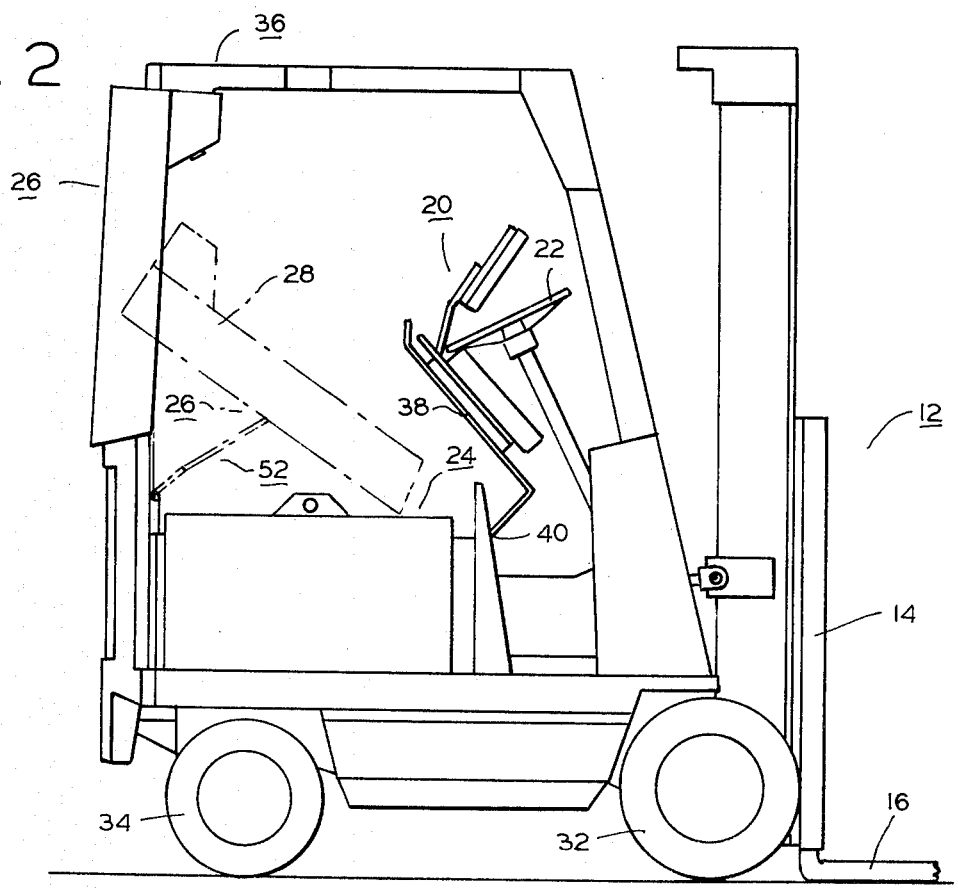
FIG. 2 is a side elevational view of the fork lift truck shown in FIG. 1, with the cover being shown in the open position, with the partially open position shown in phantom lines.

Truck 10 further includes front drive wheels 32 and rear wheels 34 which are used to steer the truck. An overhead guard assembly 36 is disposed above the operator's control station to provide protection from articles which may fall from the lifting mast assembly or from stacks or piles within the warehouse or other work area in which the truck may be used. Seat 20 is disposed on a mounting bracket 38 hinged to battery compartment 24 in front of cover 28, in the area generally indicated by numeral 40. The bracket is shaped so that the seat may be tilted forward against steering wheel 22, placing the seat in a noninterfering position permitting cover 28 to be raised as shown in FIG. 2.

Hood mechanism 26 includes the one piece cover 28 which is attached to a hinge assembly 52 pivotally connected between the battery compartment and the cover. The hinge assembly includes a torsion bar assembly 54 which assists in raising and lowering the cover, and which holds the cover in the raised position. A roller guide assembly 56, at the rear of cover 28, guides the movement of the cover between the raised and lowered positions. A latch mechanism 58 is provided which, together with seat bracket 38, secures the cover in its closed position. The cover, hinge assembly and roller guide assembly components will normally be of metal, although other suitable materials may be used.

Cover 28 includes a plate 60 of sufficient size to cover substantially the entire top opening of compartment 24, and side plates 62 and 64 extending downwardly from the plate. The side plates are longer than plate 60 and have enlarged portions 66 at the back thereof extending above the plate. An angular plate member 68 extends upwardly from plate 60 between the enlarged portions of the side plates, and a top plate 70 at the very back of the cover completes the upper covering structure. The enlarged portions 66, angular plate 68 and top plate 70 form an area in which portions of the roller guide assembly 56 are disposed, covered, and protected when the hood mechanism is in the closed position. The exact shape of the cover may vary, depending upon the type of vehicle and roller guide assembly used, and the size and shape of compartment to be covered.

Hinge assembly 52 includes a yoke 72 having arms 74 and 76 and legs 78 and 80. The arms are pivotally connected to cover 28 by torsion bar assembly 54 in a manner to be described subsequently. The pivotal connection of yoke 72 to cover 28 is along an axis approximately midway between the forward and rearward ends of the cover, to best provide the desired movement of the cover between the fully closed and fully opened positions. Hinge plates 82 and 84 are attached to legs 78 and 80 by bolts 86 and extend outwardly therefrom. Annular ends 88 and 90 of the hinge plates are received by brackets 92 and 94 attached to a rear plate 96 of battery compartment 24. Pins 98 and 100 extend through the respective annular ends and brackets, and are held in place by spring pins 102 and 104 disposed in holes in the annular ends and the pins 98 and 100 therein. Thus, hinge plates 82 and 84 are connected to pins 98 and 100, and the pins are rotatably disposed in brackets 92 and 94, thereby permitting yoke 72 to pivot about the axis formed by the pins.

Figure 3:
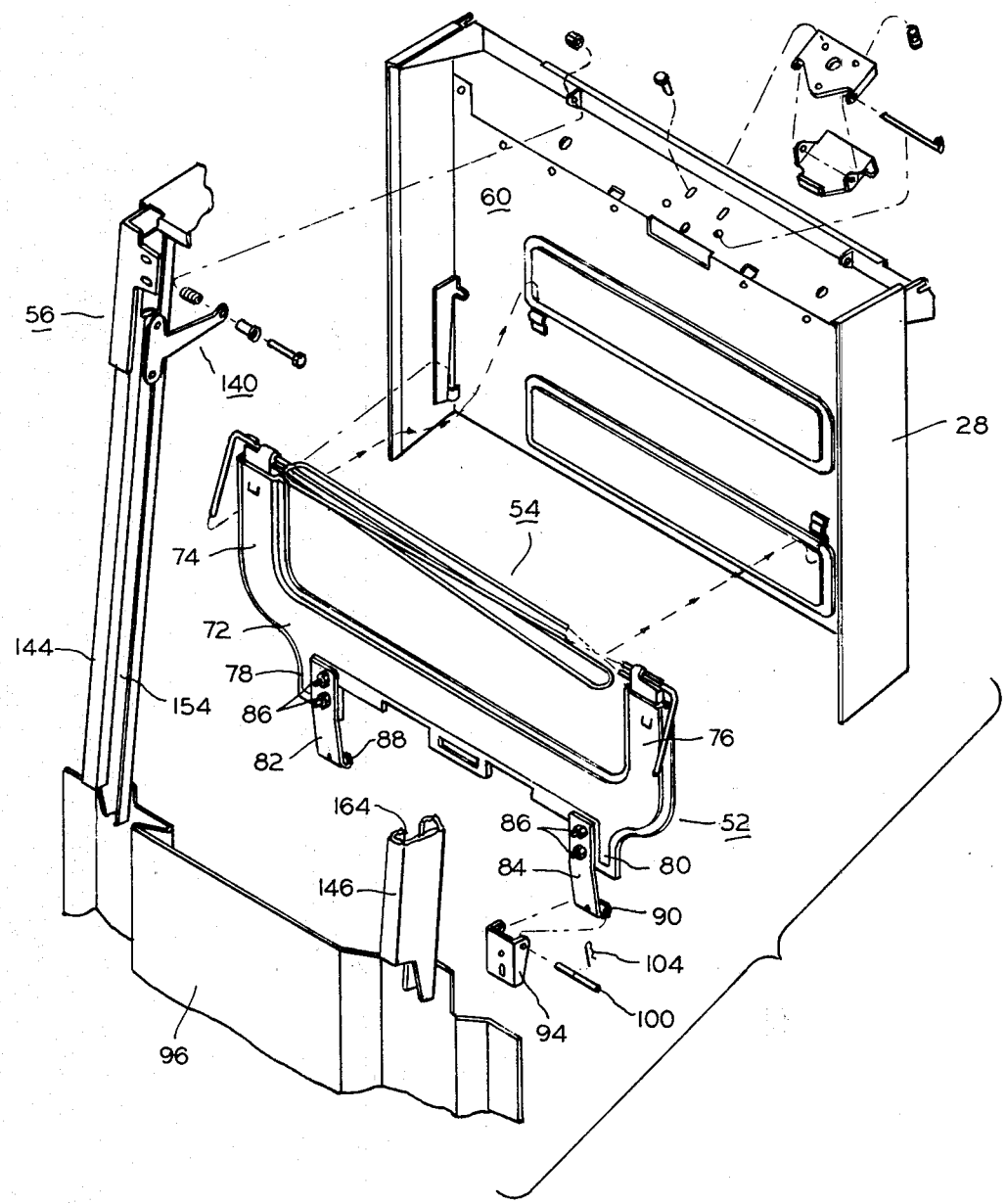
FIG. 3 is an exploded view of the battery compartment hood mechanism.
Figure 4:
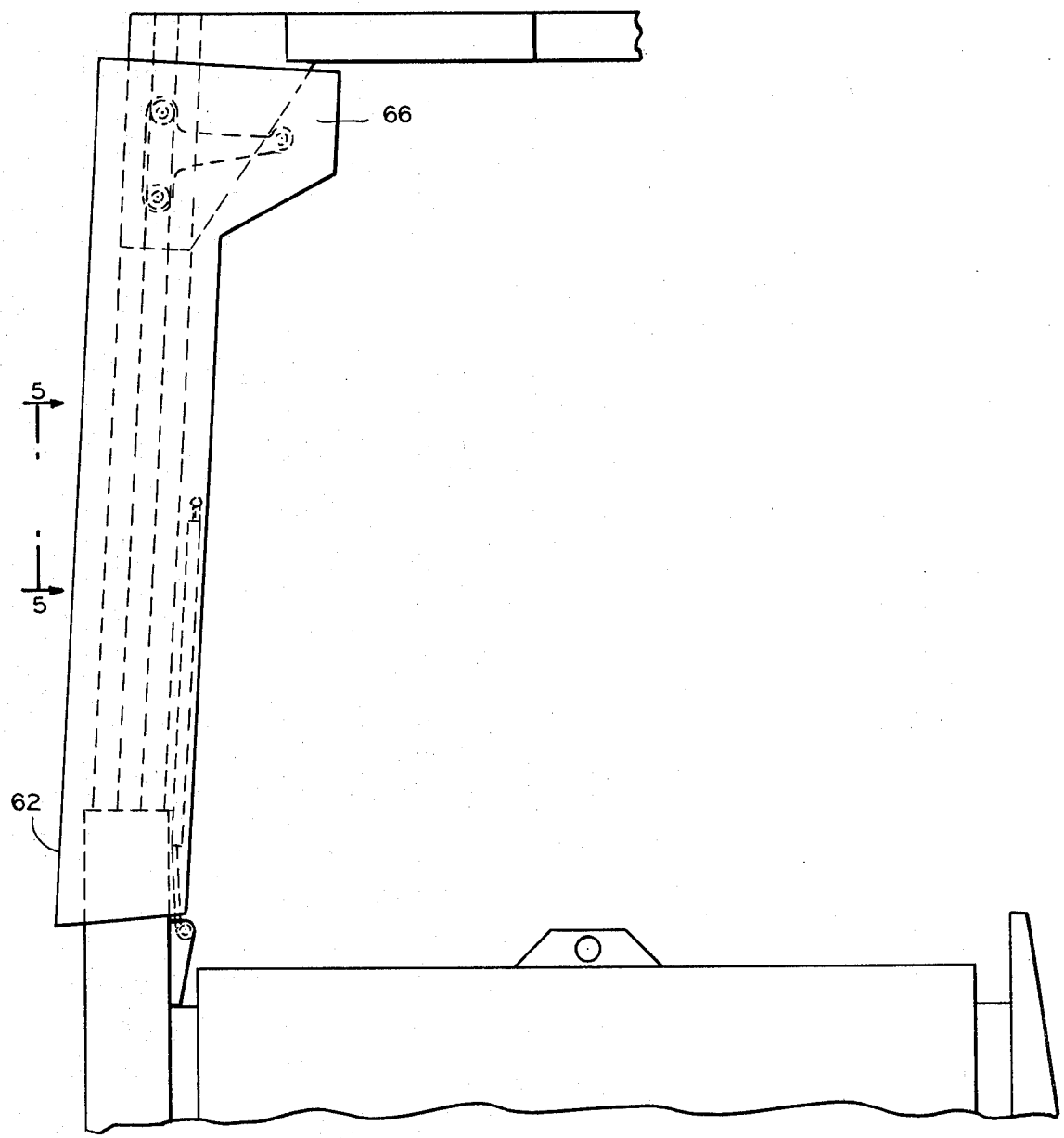
FIG. 4 is a side elevational view of the hood mechanism in the raised position.
Figure 5:
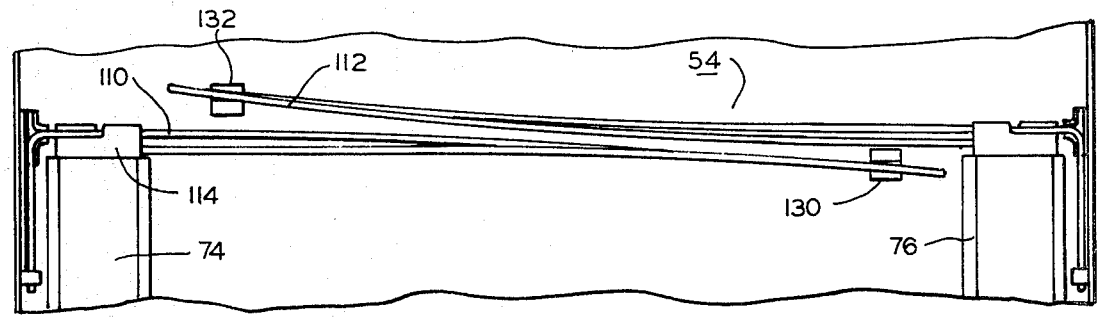
FIG. 5 is a fragmentary view of the torsion bar mechanism of the hood in the raised position, the view taken generally in the area indicated by line 5—5 in FIG. 4.
Figure 6:
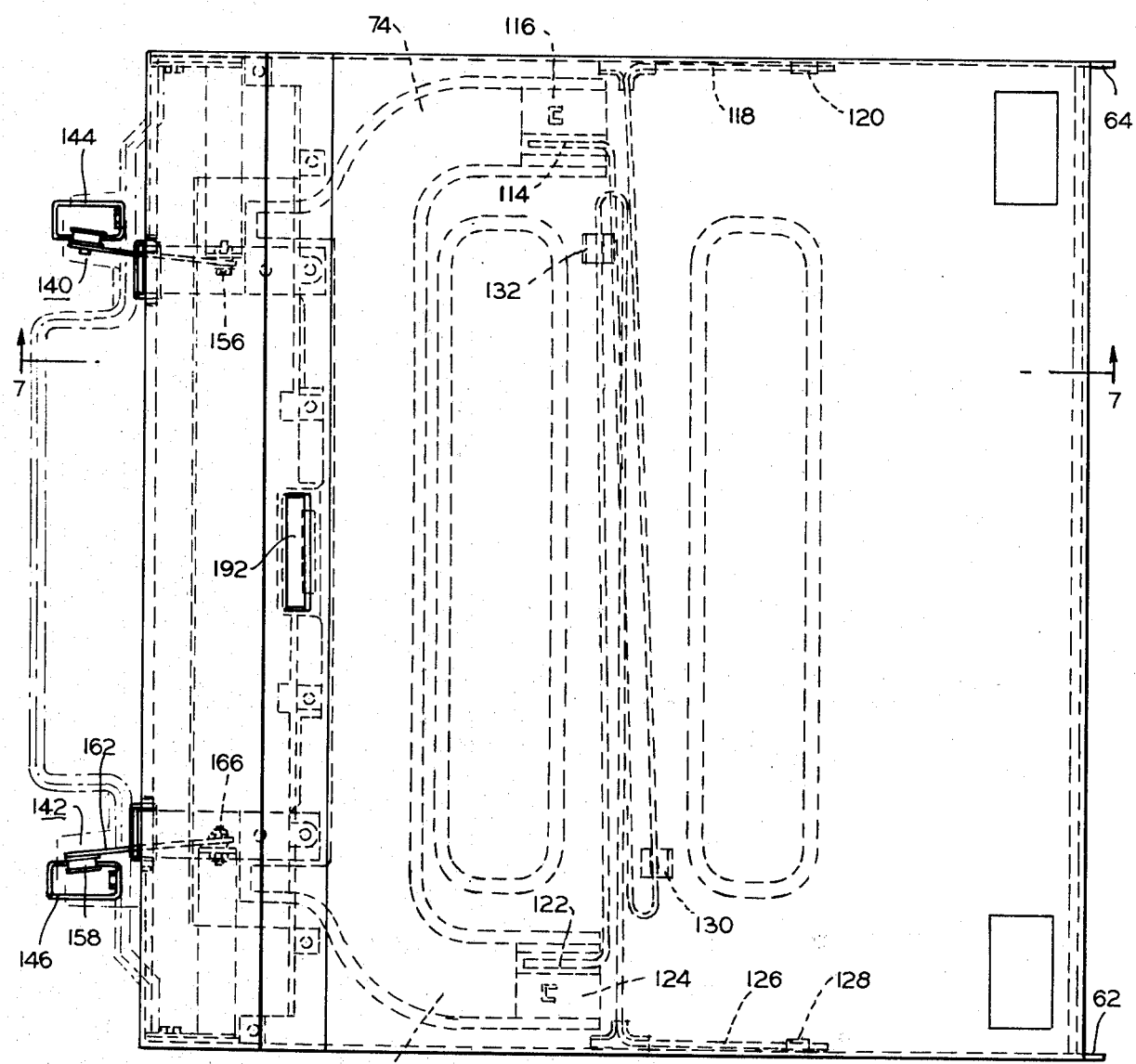
FIG. 6 is a top plan view of the hood mechanism in the closed position, with some of the concealed parts shown by phantom lines.
Figure 7:
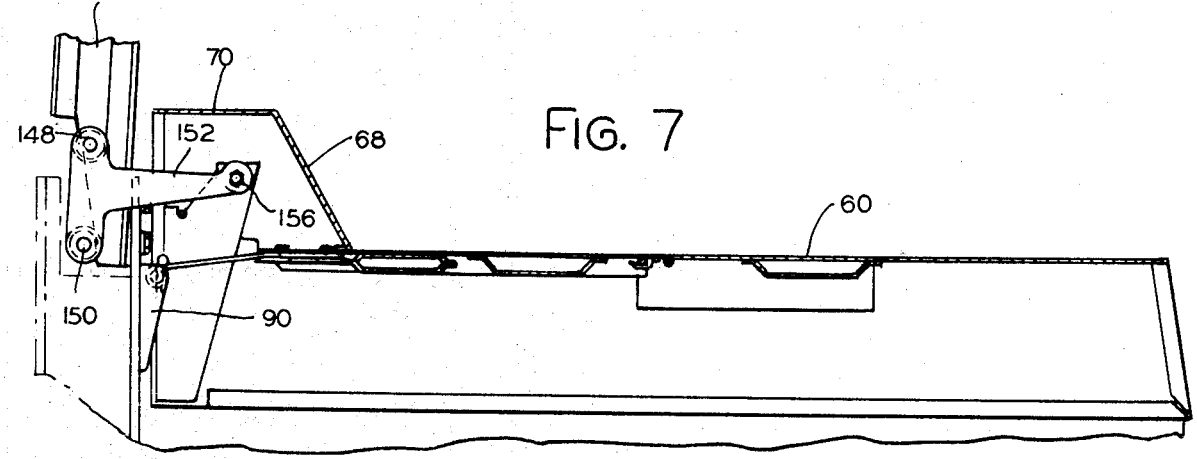
FIG. 7 is a cross sectional view of the hood mechanism shown in FIG. 6, taken on line 7—7 of the latter figure.
Figure 8:
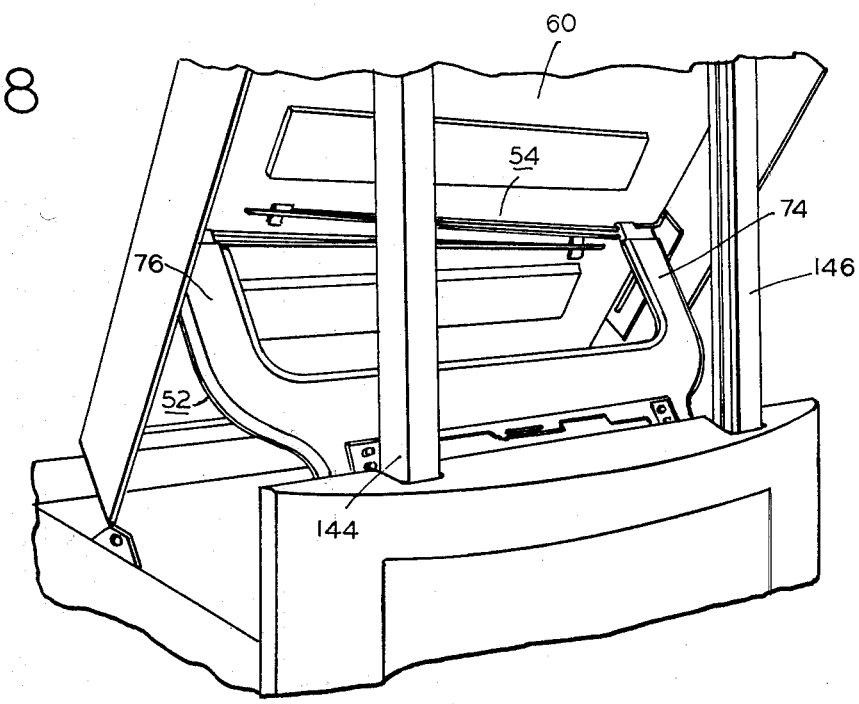
FIG. 8 is a perspective view of the rear of the hood in the partially open position.

Torsion bar assembly 54, as previously mentioned, provides mechanical assistance for opening and closing the hood mechanism, and pivotally connects cover 28 to hinge assembly 52. The torsion bar assembly includes torsion bars 110 and 112 which are in length approximately twice the width of cover 28, and have a doubled back loop construction, as shown most clearly in FIG. 6. Thus, for each torsion bar, the ends are near each other, on the same side of the hood, and the looped portion extends across the width of the hood toward the opposite side. In this arrangement, each torsion bar has one end attached to the cover and the other end attached to one of the arms 74 or 76 of yoke 72, thus providing a pivotal relationship between the cover and yoke, and providing assistance by the torsion bars during movement of the cover. End 114 of torsion bar 110 is held by a retention member 116 disposed in arm 74 of yoke 72. The other end 118 of torsion bar 110 is held in a bracket 120 on side plate 64 of cover 28. The attachment of torsion bar 112 to the hood and yoke is similar to that of torsion bar 110; hence, end 122 of torsion bar 112 is secured to a retention member 124 disposed in arm 76, and end 126 of torsion bar 112 is disposed in a bracket 128 on side plate 62. The looped portions of torsion bars 110 and 112 extend past each other and are held against plate 60 of cover 28 by retention clips 130 and 132, respectively. During the assembly of the present hood mechanism, torsion bars 110 and 112 are preloaded by placing the hood in the raised position and twisting the torsion bars as indicated by the lines and arrows shown in FIG. 3. Thus, the torsion bars will assist in holding the cover in its raised position.

Roller guide assembly 56 includes roller mechanisms 140 and 142 pivotally attached near the sides of the cover at the rearward end thereof. The roller mechanisms operate in guide brackets 144 and 146, which may be channels disposed in the rear support members of guard assembly 36. Roller mechanism 140 includes rollers 148 and 150 connected to a generally T-shaped plate 152 and operable in a channel 154 in the left rear support member of guard assembly 36. Plate 152 is pivotally connected by a bolt or pin 156 to cover 28. Roller mechanism 142 includes rollers 158 and 160 connected to a plate 162 and operable in a channel 164 in the right rear support member of guard assembly 36. Plate 162 is pivotally connected by a bolt or pin 166 to cover 28. Hence, as the rear portion of cover 28 is lifted, roller mechanisms 140 and 142 slide upwardly in channels 154 and 164, respectively, and cover 28 pivots about pins 156 and 166 with respect to plate members 152 and 162. The roller mechanisms disposed in the guide brackets direct the movement of cover 28 between its closed position and its fully opened and out of the way position.

To assist in holding the cover in its closed position, latch mechanism 58 is provided. A flange 180 having an opening 182 therein extends outwardly from yoke 72. A latch plate 184 is pivotally connected by a pin 186 to a base plate 188 connected to the cover, and has a hooked end 190 which is received by opening 182 in the flange. Latch plate 184 is biased by a spring 192 operating between the base and latch plates so that when the cover is closed, hooked end 190 is held in opening 182. A curved release handle 194 on latch plate 184 extends through an opening 196 in angular plate 68 of cover 28. Depression of release handle 194 pivots the latch plate about pin 186 and compresses spring 192 to remove hooked end 190 from opening 182 in flange 180. When cover 28 is closed, latch mechanism 58 engages with the hinge mechanism to prevent upward movement of the rear portion of the cover. The rear portion may be lifted only after handle 194 is depressed to remove hooked end 190 from the opening in flange 180. The forward end of cover 28 is restricted in undesirable movement by seat 20 which has mounting bracket 38 extending over the front portion of the cover, thereby preventing movement of the front of the cover.

In the use and operation of a lift truck hood mechanism embodying the present invention, and in the performance of the method involved in the operation, cover 28 to battery compartment 24 is held in a closed position by latch mechanism 58 and bracket 38 of seat 20. Hooked end 190 is held in opening 182 of flange 180, thereby connecting the cover to the yoke of the hinge assembly, and preventing the rearward end of the cover from being lifted and pivoted with respect to the hinge assembly. Bracket 38 of seat 20 extends over the front portion of the cover and prevents movement of the cover. When access to the battery compartment is desired, such as for normal periodic maintenance or inspection, seat 20 is lifted and pivoted about its connection in hinge area 40, so that the seat is tilted against steering wheel 22 as shown in FIG. 2. This permits the cover to be raised from the battery compartment and removed from beneath the seat bracket without interference from the seat. Before the cover may be raised, release handle 194 is depressed to remove hook end 190 from opening 182 in flange 180, hence releasing the cover from its locked relationship to the hinge assembly. Slight upward movement of the rear of the cover moves hooked end 190 from the area near opening 182, so that handle 194 may be released, and the hooked end will not engage with the opening in the flange. As the rear of the cover is raised, roller mechanism 140 and 142 ascend in guide brackets 144 and 146, thereby directing the movement of the rear of the cover in a substantially vertical path between the closed and opened positions. As the mechanisms ascend, the cover pivots about pins 156 and 166 with respect to plates 152 and 162. Torsion bars 110 and 112 exert equal moments to the cover and arms 74 and 76 of yoke 72. The moments applied to the cover and yoke are in opposite directions, so that when the cover is raised the torsion bars counterbalance the weight of the cover, thereby reducing the manual force required to raise the cover. As viewed from the right hand side of the truck, clockwise torsion bar moments are applied to the hood and equal counterclockwise torsion bar moments are applied to the yoke. Hence, the torsion bar moments tend to rotate the hook and yoke about the pivot points of each to vertical positions, and the moments exerted by the torsion bars hold the cover in the vertical position, so that the cover will not be lowered accidentally if bumped during servicing of the equipment in the battery compartment. The preloading of the torsion bars, as described previously, should be sufficient so that the hood will be adequately held in the raised position and not easily dislodged therefrom.

As the cover is raised, the rear of the cover moves in a substantially vertical line as previously described, and the front end moves horizontally toward the rear of the truck. The yoke and cover pivot with respect to each other about an axis generally defined by the torsion bars. Legs 78 and 80 of yoke 72 pivot with respect to battery compartment about an axis defined by pins 98 and 100. Thus, yoke 72 moves from a substantially horizontal position when the cover is closed, to a substantially vertical position when the cover is open, and the midline of the cover moves both rearwardly and upwardly as the cover is raised. When fully opened, the cover is disposed against the rear support members of guard assembly 36. In this position the cover presents only minimal, if any, interference with access to the compartment. The torsion bars assist in moving the hood so that one worker may easily open and close the compartment.

Figure 9:
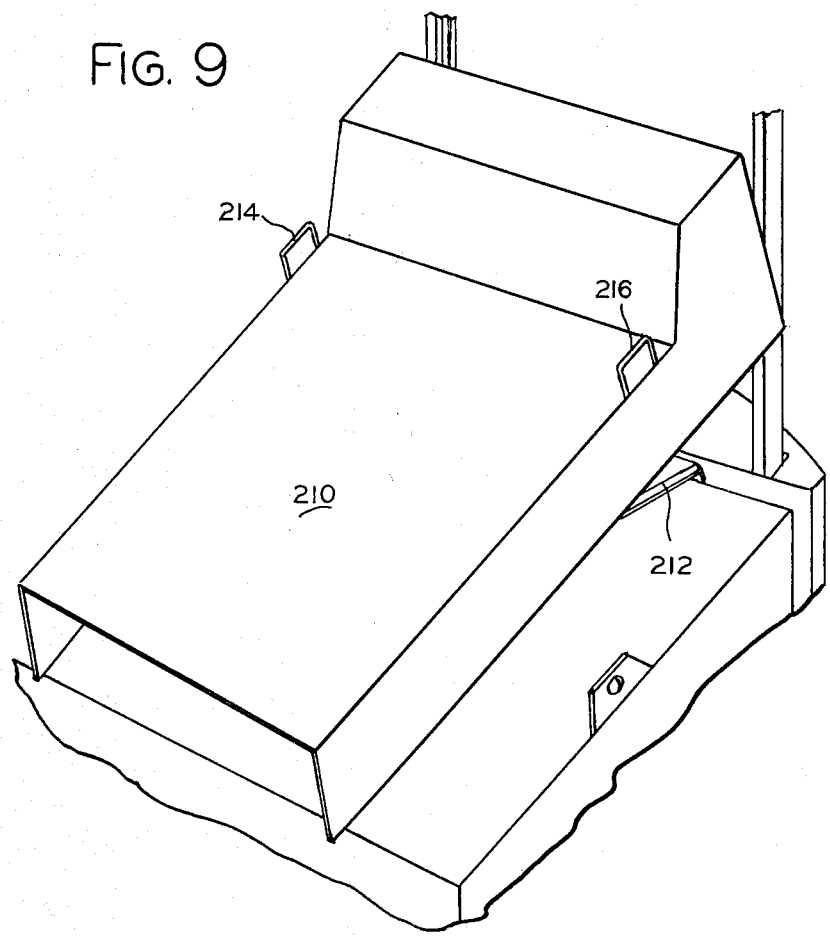
FIG. 9 is a perspective view of a modified form of the hood mechanism.
Figure 10:
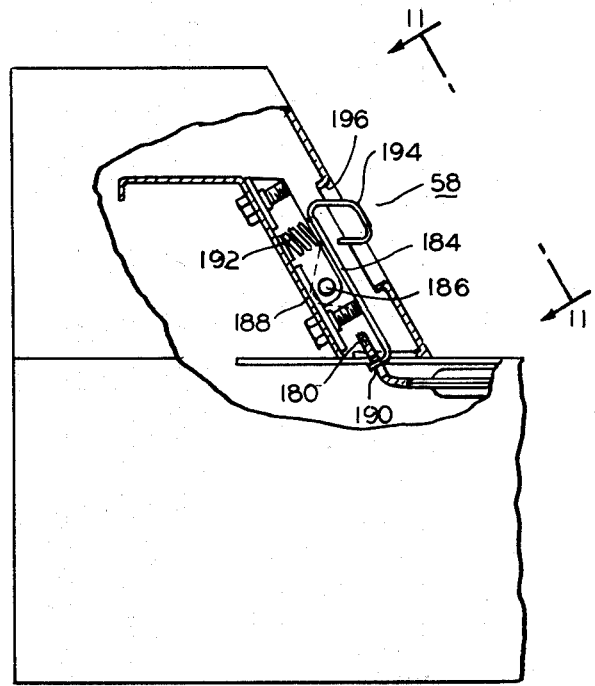
FIG. 10 is an enlarged cut-away side elevational view of the locking mechanism for the present battery compartment hood.
Figure 11:
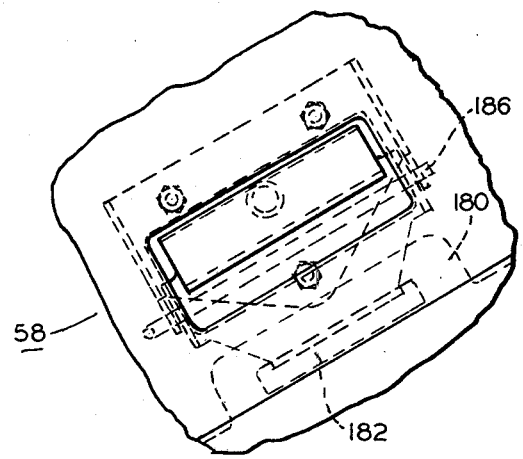
FIG. 11 is a fragmentary view of the area indicated by the line 11—11 of FIG. 10, showing some of the concealed locking mechanism parts in phantom lines.
Figure 12:
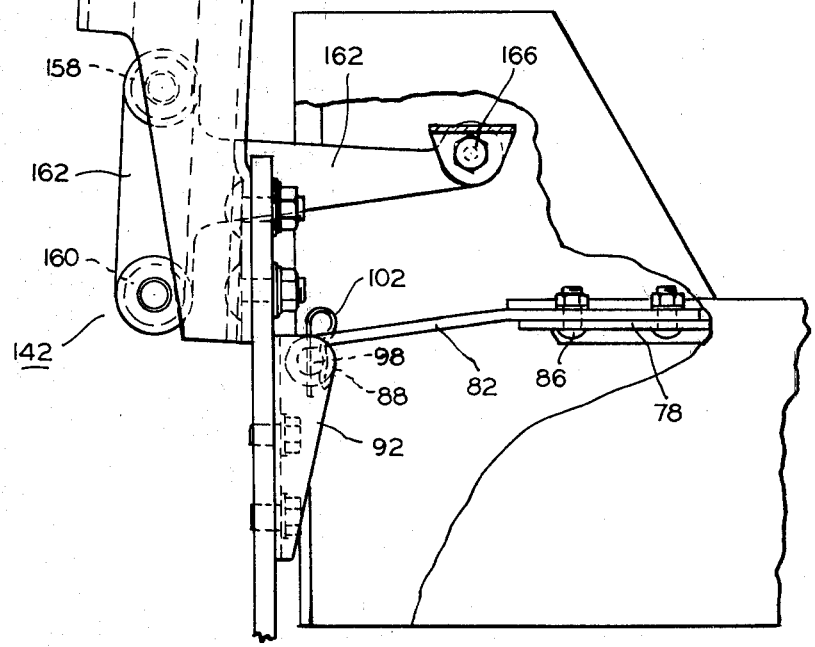
FIG. 12 is an enlarged side elevational view of the roller and track assemblies for the present hood mechanism.

The pivotal arrangement between the cover and hinge assembly may be used with lightweight hoods such as plastic or fiberglass, and in such applications normally the torsion bar assistance will not be required. In the modified form of hood mechanism shown in FIG. 9 a lightweight cover 210 has a hinge 212 pivotally connected thereto, the hinge also being pivotally connected near the rearward end of the battery compartment. Since the cover is lightweight, the torsion bars may be eliminated, as mechanical assistance for raising and lowering the hood will not be required. Handles 214 and 216 are disposed on the sides of the cover to assist one desiring to open the cover in grasping the cover. When a lightweight hood is used, the roller guide assembly 56 also may be eliminated, as the person raising the hood can manually control the movement of the rear end of the hood as the cover is raised. A hook or latching device will be required to hold the cover in the raised position, since the torsion bars are eliminated, and may take the form of a stop on the guard assembly preventing forward movement of the top of the cover at the open position, and a pin or latch securing the lower portion of the hood to prevent movement thereof. A latch mechanism similar to mechanism 58 may be used to hold the cover in the closed position, and the seat and bracket assembly previously described may also be used with the modified embodiment.

It is clear that hood mechanisms embodying the present invention provide simple and substantially effortless opening of the battery compartment. One worker may quickly and easily open the cover, and the cover is moved to a substantially out of the way position so as not to interfere with persons working in and around the battery compartment. The present hood mechanism requires the removal of no parts and hence eliminates the possibility of damaging or mislaying parts. The cover is securely held in both the opened and closed positions to prevent accidental movement thereof, and the method whereby the present hood is opened may be used equally well on heavier metal hoods or on lightweight fiberglass or plastic hoods.

Although one embodiment and one modification of a lift truck hood mechanism and the method for operation thereof have been described in detail herein, various other changes may be made without departing from the scope of the present invention.

I claim:

1. A hood mechanism for the power source compartment of an industrial truck, comprising a cover for enclosing the top of the compartment, a hinge mechanism between said cover and the truck for moving said cover between a horizontal closed position and a vertical opened position, a first pivotal means for connecting said hinge mechanism to said cover near the center line between the forward and rearward ends of said cover, a second pivotal means for connecting said hinge mechanism to said truck at one end of the compartment, and guide means for controlling the movement of one end of said cover in a substantially vertical path between the closed and opened positions of the cover while the opposite end of said cover moves in a substantially horizontal direction.

2. A hood mechanism as defined in claim 1 in which said second pivotal means connects said hinge mechanism to the vehicle near the rearward end of the compartment.

3. A hood mechanism as defined in claim 1 in which said hinge mechanism includes spring means for assisting in raising and lowering said cover.

4. A hood mechanism as defined in claim 2 in which said hinge mechanism includes spring means for assisting in raising and lowering said end moving in a vertical path.

5. A hood mechanism as defined in claim 2 in which said first pivotal means includes torsion bars connected to said hinge mechanism and said cover.

6. A hood mechanism as defined in claim 2 in which said hinge mechanism includes a yoke having arms extending therefrom, and at least one torsion bar connected on one end to one of said arms, and on the other end to said cover.

7. A hood mechanism as defined in claim 1 in which said guide means includes rollers connected to said cover, and roller guides, in which said rollers operate, extend vertically from the rear of said compartment.

8. A hood mechanism as defined in claim 2 in which roller mechanisms are connected to and extend rearwardly from said cover, said truck includes rear support members for an overhead guard assembly, and rollers on said roller mechanisms operate in channels in said support members.

9. A hood mechanism as defined in claim 8 in which said hinge mechanism includes a yoke having arms extending therefrom, and at least one torsion bar connected on one end to one of said arms and on the other end to said cover.

10. A hood mechanism as defined in claim 6 in which a flange extends outwardly from said yoke, and a latching device is provided for connecting said cover to said flange to hold the rear of said cover in the closed position.

11. A hood mechanism as defined in claim 9 in which a flange extends outwardly from said yoke, and a latching device is provided for connecting said cover to said flange to hold the rear of said cover in the closed position.

12. A hood mechanism as defined in claim 11 in which a bracket extends partially over the top of said cover at the front thereof, and is pivotally connected to the truck in spaced relation to said cover, and an operator's seat is disposed on said bracket.

13. A hood mechanism as defined in claim 1 in which handles are provided on said cover to be grasped for opening said compartment.

14. A hood mechanism as defined in claim 13 in which said cover is constructed of plastic.

15. A method for raising a compartment cover on an industrial vehicle from a substantially horizontal position to a substantially vertical position permitting access to the compartment, said method comprising the steps of lifting one end of the cover, guiding said lifting of one end in a substantially vertical path between closed and opened positions of the cover, pivoting the cover at the center thereof about an axis transverse to the vehicle, moving the axis toward the end of the compartment below the end of the cover being lifted and raising the axis while pivoting the cover and moving the axis toward the end of the compartment.

16. The method for raising a cover as defined in claim 15 in which said step of guiding said lifting of the one end is performed by operating a roller in a vertical track.

17. The method for raising a cover as defined in claim 15 which further comprises the step of securing the cover in the vertical position.

18. The method for raising a cover as defined in claim 15 in which said steps of moving and raising the axis are performed by a yoke pivotally connected to the cover and to the vehicle.

19. The method for raising a cover as defined in claim 16 in which said steps of moving and raising the axis are performed by a yoke pivotally connected to the cover and to the vehicle.

20. The method for raising a cover as defined in claim 17 in which said steps of moving and raising the axis are performed by a yoke pivotally connected to the cover and to the vehicle.

21. The method for raising a cover as defined in claim 15 which further includes the step of unlatching the cover from the yoke before said lifting of one end.

22. The method for raising a cover as defined in claim 17 which further includes the step of unlatching the cover from the yoke before said lifting of one end.

23. The method for raising a cover as defined in claim 20 which further includes the step of unlatching the cover from the yoke before said lifting of one end.

* * * * *